(12) United States Patent
Pikkujamsa et al.

(10) Patent No.: US 9,569,086 B2
(45) Date of Patent: Feb. 14, 2017

(54) USER INTERFACE HAVING REALISTIC PHYSICAL EFFECTS

(75) Inventors: Kalle Pikkujamsa, Oulu (FI); Jukka Linjama, Espoo (FI); Juha Kela, Oulu (FI); Panu Korpipaa, Oulu (FI); Sanna Kallio, Oulu (FI); Tapani Rantakokko, Oulunsalo (FI)

(73) Assignee: Nokia Technologies Oy, Espoo (FI)

( * ) Notice: Subject to any disclaimer, the term of this patent is extended or adjusted under 35 U.S.C. 154(b) by 1289 days.

(21) Appl. No.: 11/954,845

(22) Filed: Dec. 12, 2007

(65) Prior Publication Data

US 2009/0201270 A1    Aug. 13, 2009

(51) Int. Cl.
| | |
|---|---|
| G09G 5/00 | (2006.01) |
| G06F 3/033 | (2013.01) |
| G06F 3/0486 | (2013.01) |
| G06F 1/16 | (2006.01) |
| G06F 3/01 | (2006.01) |
| G06F 3/0481 | (2013.01) |

(52) U.S. Cl.
CPC .......... *G06F 3/0486* (2013.01); *G06F 1/1626* (2013.01); *G06F 1/1684* (2013.01); *G06F 1/1694* (2013.01); *G06F 3/017* (2013.01); *G06F 3/04812* (2013.01); *G06F 3/04817* (2013.01); *G06F 2200/1637* (2013.01)

(58) Field of Classification Search
USPC ................................................. 345/156, 169
See application file for complete search history.

(56) References Cited

U.S. PATENT DOCUMENTS

| | | | |
|---|---|---|---|
| 5,490,223 A * | 2/1996 | Nishimura et al. | 382/159 |
| 5,548,667 A * | 8/1996 | Tu | 382/285 |
| 5,634,908 A | 6/1997 | Loomas | |
| 5,720,759 A | 2/1998 | Green et al. | |
| 5,748,769 A * | 5/1998 | Nishimura et al. | 382/159 |
| 6,315,694 B1 * | 11/2001 | Osu et al. | 482/8 |
| 6,359,621 B1 * | 3/2002 | Maeda et al. | 345/473 |
| 6,375,572 B1 * | 4/2002 | Masuyama et al. | 463/43 |
| 6,933,923 B2 * | 8/2005 | Feinstein | 345/158 |
| 6,942,671 B1 | 9/2005 | Smith | |
| 7,203,635 B2 * | 4/2007 | Oliver et al. | 703/22 |
| 7,365,741 B2 * | 4/2008 | Chincholle et al. | 345/169 |
| 7,474,772 B2 * | 1/2009 | Russo et al. | 382/124 |
| 7,578,742 B2 * | 8/2009 | Miyamoto et al. | 463/37 |
| 7,612,786 B2 * | 11/2009 | Vale et al. | 345/619 |
| 7,812,826 B2 * | 10/2010 | Ording et al. | 345/173 |
| 7,958,456 B2 * | 6/2011 | Ording et al. | 715/784 |

(Continued)

OTHER PUBLICATIONS

International Search Report and Written Opinion for International Application No. PCT/EP2008/008662, mailed Feb. 19, 2009.

(Continued)

*Primary Examiner* — Afroza Chowdhury
(74) *Attorney, Agent, or Firm* — Alston & Bird LLP (57) ABSTRACT

A user interface module includes a display and a motion detector arranged to detect a motion. The module is arranged to display an emulated movement of a graphical representation of a first object on the display according to a motion detected by the motion detector. The first object has a physical characteristic and the user interface module further includes a controller module arranged to generate the emulated movement based on the physical characteristic.

24 Claims, 6 Drawing Sheets

(56) References Cited

U.S. PATENT DOCUMENTS

| | | | |
|---|---|---|---|
| 2004/0088146 A1* | 5/2004 | Forest et al. | 703/2 |
| 2004/0095346 A1* | 5/2004 | Tomita | 345/419 |
| 2005/0012714 A1* | 1/2005 | Russo et al. | 345/157 |
| 2005/0151720 A1* | 7/2005 | Cruz-Hernandez et al. | 345/156 |
| 2005/0195156 A1* | 9/2005 | Pihlaja et al. | 345/156 |
| 2006/0189920 A1 | 8/2006 | Seeh | |
| 2007/0150830 A1* | 6/2007 | Ording et al. | 715/784 |
| 2007/0178974 A1 | 8/2007 | Masuyama et al. | |
| 2008/0125716 A1 | 5/2008 | Cruz | |
| 2008/0256484 A1* | 10/2008 | Kraft et al. | 715/799 |
| 2009/0088204 A1* | 4/2009 | Culbert et al. | 455/556.1 |
| 2009/0122018 A1* | 5/2009 | Vymenets et al. | 345/173 |
| 2011/0035691 A1* | 2/2011 | Kim | 715/765 |

OTHER PUBLICATIONS

Extended European Search Report for European Patent Application No. 10252142.4, dated May 20, 2011, 5 pages.
Office Action for European Application No. EP 08 858 967.6 dated May 19, 2016.

* cited by examiner

USER INTERFACE HAVING REALISTIC PHYSICAL EFFECTS

FIELD

The present application relates to a device and a method for providing quick access to information stored on or accessible through a device, and in particular to a device and a method for providing quick access to data stored on or accessible through a device by using tap commands.

BACKGROUND

More and more electronic devices such as mobile phones, MP3 players, Personal Digital Assistants (PDAS) are becoming smaller and smaller while having more and more information stored and/or accessible through them. Users are relying on these devices and becoming all the more dependant on them. Due to the devices' complexity they can sometimes be difficult for a user to learn and understand. There is a plethora of functionalities, features, applications and shortcuts available through a wide variety of user inputs such as touch input, key pad input, stylus input and recently also sensor based input such as tap input or tilting movement input using accelerometers. The sheer amount of possibilities can thus become bewildering to a user and increase the effort required to learn and understand the device significantly.

The environments in which these devices are used are also becoming more and more hectic with higher demands on fast access and multitasking, and not only in a professional environment but also in private and social environments. For example a user should be able to read a book, while holding a grocery bag in a rattling subway train and still be able to access the information stored in the device for the device to live up to the many requirements posed upon it by a user buying and using the device. This requires that the device is simple to learn and intuitive to use.

SUMMARY

On this background, it would be advantageous to provide a device and a method that overcomes or at least reduces the drawbacks indicated above by providing user interface, a device and a method that is easy to learn and understand and intuitive to use.

The disclosed embodiments provide a user interface module comprising a display and a motion detector arranged to detect a motion, said module being arranged to display an emulated movement of a graphical representation of a first object on said display according to a motion detected by said motion detector.

By controlling a user interface with movements, a user interface that is simple to use is achieved.

In one embodiment the first object comprises a physical characteristic and said user interface module further comprises a controller module arranged to generate said emulated movement based on said physical characteristic.

Through having a physical model and basing the movements on this model and thereby on physical characteristics of the objects the object's behaviour becomes more intuitive and easy to understand by a user thereby rendering the user interface easy to learn and use.

In one embodiment the physical characteristic is a mass for emulating inertia of said object, in one embodiment the physical characteristic is a velocity vector and in one embodiment the physical characteristic is an extent. This enables realistic dynamic behaviour to be modelled on physical laws.

In one embodiment the display has a display area and the graphical representation of said object is smaller than the display area. This enables an overview of more than one object and a visual indication of the object's movement and interaction with other objects displayed on the same display and the resulting emulated behaviour. This further increases the intuitive association between a physical motion with a resulting action.

In one embodiment the physical characteristics comprise a spring coefficient and a damping coefficient and wherein said generation of said emulated movement is based on a damped spring dynamic.

In one embodiment the generation of said emulated movement comprises determining an updated position from an original position depending on said physical characteristics and said motion detected by the motion detector and wherein said displaying of said emulated movement comprises displaying said object at said updated position.

In one embodiment the user interface is further arranged to display graphical representations of at least one additional object, wherein said at least one additional object has physical characteristics and said generation of said emulated movement of said first object is further based on said physical characteristics of said at least one additional object. In a user interface with more than one object a co-relation or dependency between data entities can be established thus making the user interface more versatile.

In one embodiment the first object and/or said at least one additional object has a data value wherein said user interface module is further arranged to display said data value as part of said graphical representation of said object. This makes it easy to display information to a user.

In one embodiment the user interface is further arranged to execute a function associated with a movement pattern and wherein said controller module is arranged to execute said function on said object upon detection of said movement pattern. This makes the control and activation of operations or functions easy to initiate as no precise movement, like hitting a specific key, is required and the user interface is further intuitive as the function is visibly connected to an object.

In one embodiment the movement pattern corresponds to a throwing movement and said movement function is a delete operation and in one embodiment the movement pattern corresponds to an upwards movement and said movement function is an open operation.

In one embodiment an object has an associated function. Directly associating a function with an object makes it further intuitive to execute the function and does not clutter the display area with functional labels.

In one embodiment a movement pattern corresponds to an emulated collision between one object having a data value and one object having an associated object function, and wherein said user interface is arranged to execute said function on said data value upon detection of said emulated collision. Causing a collision or forcing to objects to touch provides a mental image of how to execute a function that correlates function and data value in a simple and easy to learn and remember manner.

In one embodiment the function is any taken from the group comprising: a delete operation, a call operation, a send message operation, a postpone operation, an open operation and a read out operation.

In one embodiment the object is an area object. In one embodiment the additional object is static.

In one embodiment the display and the motion detector are arranged in the one and same housing which further increases the intuitive connection or coupling between the motions and the realistically modelled resulting movements and associated actions.

The aspects of the disclosed embodiments are also directed to providing a device having a module as above. In one embodiment the device is a mobile terminal.

The aspects of the disclosed embodiments are also directed to providing a method for controlling a user interface comprising a display, a motion detector and at least one object, said method comprising detecting a motion, emulating a movement for said at least one object according to said motion, wherein an updated position is determined, and displaying said at least one object at said updated position, wherein the movement emulation is based on a physical characteristic of said object. This provides for a dynamic method for controlling a user interface that is easy to control and intuitive to learn yet versatile and expandable.

In one embodiment the method further comprises determining whether a collision between a first and a second object is caused by said emulated movement and emulating said movement accordingly. The collision concept simulates or models co-dependencies between objects in a way that is easy to control and intuitive to use, learn and understand.

In one embodiment an object has an associated function corresponding to a movement pattern and said method further comprises determining whether said detected motion completes said movement pattern and if so execute said function. This associates an object with a functionality in a realistic and intuitive manner.

In one embodiment the movement pattern is a collision.

In one embodiment the at least one object has a data value and said method further comprises executing said associated function on said data value upon a completed movement pattern. This provides a manner in which a data is related to a function in a very intuitive manner.

In one embodiment the execution of said associated function comprises generating an additional object.

According to another aspect of this application the disclosed embodiments are directed to providing a user interface module comprising motion detector means for detecting a motion, and display means for displaying an emulated movement of a graphical representation of a first object according to a motion detected by said motion detector means.

In one embodiment the first object comprises a physical characteristic and said user interface module further comprises controller means for generating said emulated movement based on said physical characteristic.

In one embodiment the first object and/or at least one additional object has a data value wherein said user interface module further comprises display means for displaying said data value as part of said graphical representation.

In one embodiment the user interface further comprises means for executing a function associated with a movement pattern on said object upon detection of said movement pattern.

A user interface such as this has the same benefits as explained for the user interface and method above.

According to another aspect of this application the disclosed embodiments are directed to providing a computer readable medium including at least computer program code for controlling a user interface comprising a display, motion detector and at least one object, said computer readable medium comprising software code for receiving a motion through said motion detector, software code for emulating a movement for said at least one object, and software code for displaying said movement of said at least one object.

In one embodiment the computer readable medium further comprises software code for determining whether said motion completes a movement pattern and if so for executing an associated function corresponding to said movement pattern.

This enables a device to benefit from the advantages as described above and also later in the detailed description by executing the software code.

In one aspect the objectives are achieved by a device incorporating and implementing a computer readable medium according to above.

Further objects, features, advantages and properties of device, method and computer readable medium according to the present application will become apparent from the detailed description.

BRIEF DESCRIPTION OF THE DRAWINGS

In the following detailed portion of the present description, the teachings of the present application will be explained in more detail with reference to the example embodiments shown in the drawings, in which.

DETAILED DESCRIPTION OF PREFERRED EMBODIMENTS

In the following detailed description, the device, the method and the software product according to the teachings for this application in the form of a cellular/mobile phone will be described by the embodiments. It should be noted that although only a mobile phone is described the teachings of this application can also be used in any electronic device such as in portable electronic devices such as laptops, PDAs, mobile communication terminals, electronic books and notepads and other electronic devices offering access to information.

Figure 1:
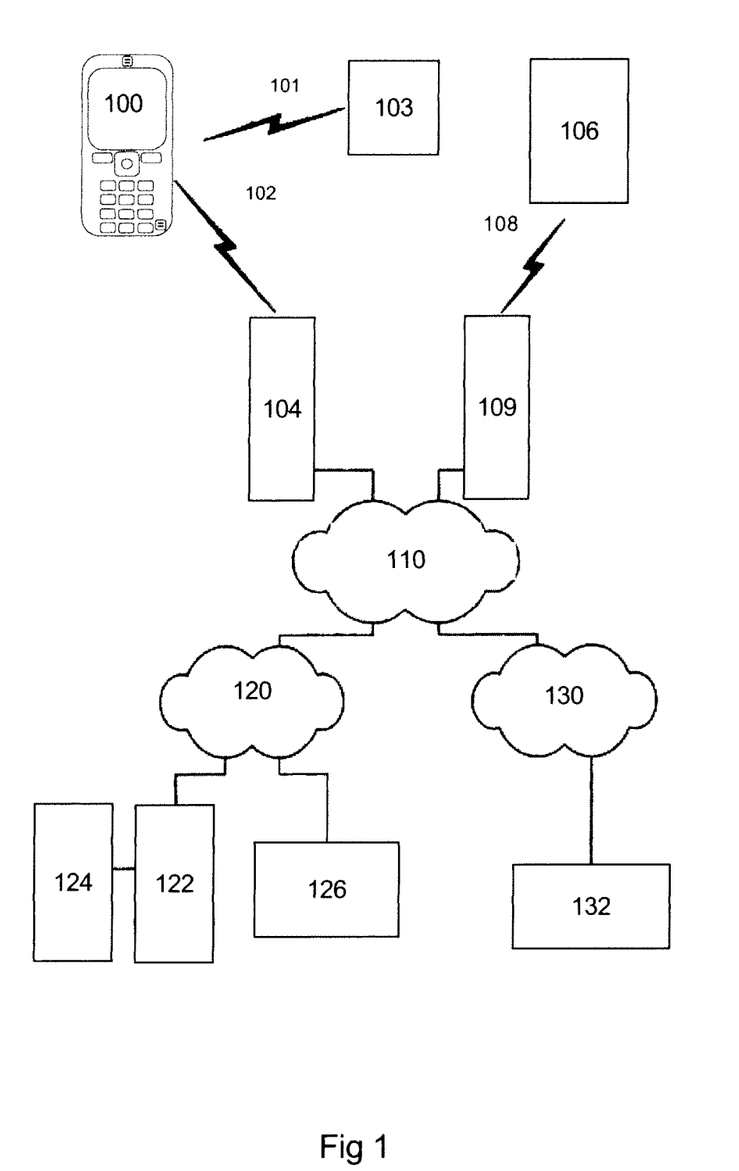
FIG. 1 is an overview of a telecommunications system in which a device according to the present application is used according to an embodiment.

FIG. 1 illustrates an example of a cellular telecommunications system in which the teachings of the present application may be applied. In the telecommunication system of FIG. 1, various telecommunications services such as cellular voice calls, www/wap browsing, cellular video calls, data calls, facsimile transmissions, music transmissions, still image transmissions, video transmissions, electronic message transmissions and electronic commerce may be performed between a mobile terminal 100 according to the teachings of the present application and other devices, such as another mobile terminal 106 or a stationary telephone 132. It is to be noted that for different embodiments of the mobile terminal 100 and in different situations, different ones of the telecommunications services referred to above may or may not be available; the teachings of the present application are not limited to any particular set of services in this respect.

The mobile terminals 100, 106 are connected to a mobile telecommunications network 110 through RF links 102, 108 via base stations 104, 109. The mobile telecommunications network 110 may be in compliance with any commercially available mobile telecommunications standard, such as GSM, UMTS, D-AMPS, CDMA2000, FOMA and TD-SCDMA.

The mobile telecommunications network 110 is operatively connected to a wide area network 120, which may be Internet or a part thereof. An Internet server 122 has a data storage 124 and is connected to the wide area network 120, as is an Internet client computer 126. The server 122 may host a www/wap server capable of serving www/wap content to the mobile terminal 100.

A public switched telephone network (PSTN) 130 is connected to the mobile telecommunications network 110 in a familiar manner. Various telephone terminals, including the stationary telephone 132, are connected to the PSTN 130.

The mobile terminal 100 is also capable of communicating locally via a local link 101 to one or more local devices 103. The local link can be any type of link with a limited range, such as Bluetooth, a Universal Serial Bus (USB) link, a Wireless Universal Serial Bus (WUSB) link, an IEEE 802.11 wireless local area network link, an RS-232 serial link, etc. The local devices 103 can for example be various sensors that can communicate measurement values to the mobile terminal 100 over the local link 101.

Figure 2:
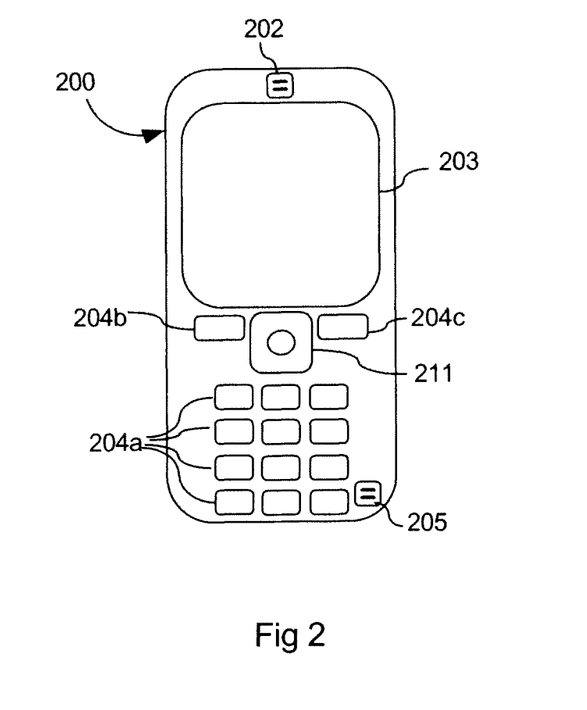
FIG. 2 is a plane front view of a device according to an embodiment.

An embodiment 200 of the mobile terminal 100 is illustrated in more detail in FIG. 2. The mobile terminal 200 comprises a speaker or earphone 202, a microphone 205, a main or first display 203 and a set of keys 204 which may include a keypad 204a of common ITU-T type (alpha-numerical keypad representing characters "0"-"9", "*" and "#") and certain other keys such as soft keys 204b, 204c and a joystick 211 or other type of navigational input device. The mobile phone may also comprise an extra display, a secondary display arranged on the backside of the mobile phone 200 (shown in FIG. 4).

In the following a display will be referred to as being inactive when it or the display image on it is not visible to a user and it is not used to display any information or other data. A skilled person will realize that the display can still be functioning although at using less power than when it is active, i.e. the displayed image is visible to a user.

Figure 3:
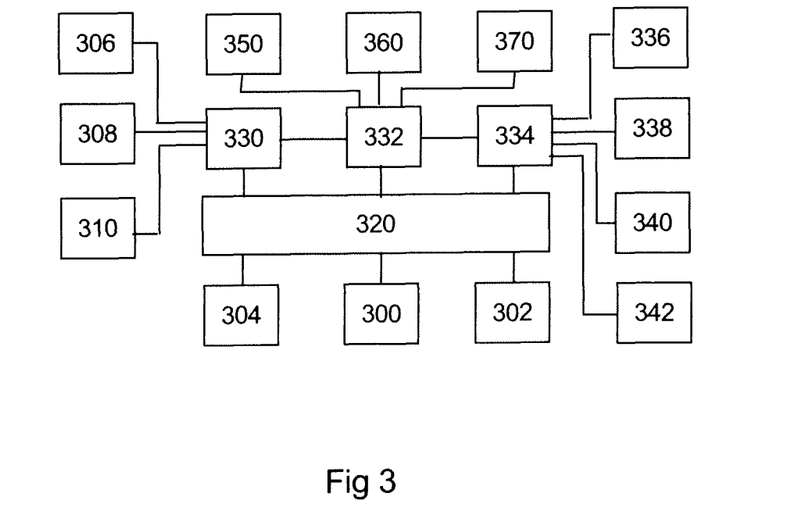
FIG. 3 is a block diagram illustrating the general architecture of a device of FIG. 1 in accordance with the present application, FIGS. 4 a, b, c, d, e, f, g, h and i are plane front views of a device according to an embodiment.

The internal component, software and protocol structure of the mobile terminal 200 will now be described with reference to FIG. 3. The mobile terminal has a controller 300 which is responsible for the overall operation of the mobile terminal and may be implemented by any commercially available CPU ("Central Processing Unit"), DSP ("Digital Signal Processor") or any other electronic programmable logic device. The controller 300 has associated electronic memory 302 such as RAM memory, ROM memory, EEPROM memory, flash memory, or any combination thereof. The memory 302 is used for various purposes by the controller 300, one of them being for storing data used by and program instructions for various software in the mobile terminal. The software includes a real-time operating system 320, drivers for a man-machine interface (MMI) 334, an application handler 332 as well as various applications. The applications can include a calendar application 350, a notepad application 360, as well as various other applications 370, such as applications for voice calling, video calling, sending and receiving Short Message Service (SMS) messages, Multimedia Message Service (MMS) messages or email, web browsing, an instant messaging application, a phone book application, a calendar application, a control panel application, a camera application, one or more video games, a notepad application, etc.

The MMI 334 also includes one or more hardware controllers, which together with the MMI drivers cooperate with the first display 336/203, the secondary display 340, the keypad 338/204 and a movement sensor or detector 342 as well as various other I/O devices such as microphone, speaker, vibrator, ringtone generator, LED indicator, etc. As is known to a man skilled in the art the movement detector 342 can be implemented with for example an acceleration sensor or an other sensor capable of detecting a motion. Examples of such sensors are micro-electromechanical systems (MEMS), nano-electromechanical systems (NANS), piezo acceleration sensors, vibration sensors, laser accelerometers, resonance accelerometers, strain gauge accelerometers, capacitive spring Mass based accelerometers, electro-mechanical accelerometers, optical accelerometers or gyroscopes. As is commonly known, the user may operate the mobile terminal through the man-machine interface thus formed.

The software also includes various modules, protocol stacks, drivers, etc., which are commonly designated as 330 and which provide communication services (such as transport, network and connectivity) for an RF interface 306, and optionally a Bluetooth interface 308 and/or an IrDA interface 310 for local connectivity. The RF interface 306 comprises an internal or external antenna as well as appropriate radio circuitry for establishing and maintaining a wireless link to a base station (e.g. the link 102 and base station 104 in FIG. 1). As is well known to a man skilled in the art, the radio circuitry comprises a series of analogue and digital electronic components, together forming a radio receiver and transmitter. These components include, band pass filters, amplifiers, mixers, local oscillators, low pass filters, AD/DA converters, etc.

The mobile terminal also has a SIM card 304 and an associated reader. As is commonly known, the SIM card 304 comprises a processor as well as local work and data memory.

FIG. 4 show a device in the form of a mobile phone 400 according to the present application. The mobile phone 400 has a user interface enabling a user to interact with the device through a display 402 and some input. This input can either be a keypad 204, as in FIG. 2, or a movement sensor 404 such as an accelerometer. The keypad can have physical keys, soft keys, virtual keys or any combination of these depending on design choices. A combination of movement sensors and keys is also plausible and highly beneficial. In the following description focus will only be given to the motion detector 402, but it should be understood that the teachings herein work equally well with any combination of a motion detector and keys as above.

A motion detector 404 (342 in FIG. 3) is arranged in the mobile phone 400. The motion detector is shown in dashed lines as it is part of the internal circuitry of the mobile phone and not is visible as disclosed above. Upon detection of a motion or a movement pattern a detection signal is generated and processed by the controller (300 in FIG. 3) of the mobile phone 400. It should be understood that the motion detector 404 could comprise both a sensor for detecting the physical movement and a controller for differentiating between different physical movements and movement patterns, which controller could be the same as the controller 300 of the mobile phone 400.

It should be noted that as the display 402 and the motion detector 404 are arranged in the same housing of a device, in this embodiment a mobile phone 400, the user interface may respond to physical forces which the device is subjected to and it may serve as part of a multimodal feedback.

As is commonly known the display 402 is used to relay information to a user and enable him to interact with the mobile phone 400. The information is relayed by being displayed on the display 402. Traditionally this information is displayed statically. As motion control of a mobile phone is in its very nature dynamic it can be confusing to a user to relate the dynamical control movements to the static functions and behaviour of the mobile phone 400.

To overcome this, a dynamic model, with user interface elements or objects, is used to create a dynamic relationship between objects that are used to relay information. The objects 406, 407 and 408 can have different traits or characteristics which will be discussed in more details below. Three examples of characteristics are a data value, an associated function and if the object is movable or not. An object with a data value is usually used to display this data value. An object with an associated function is used to inform the user that the function is available and if effected to initiate or execute the function. Non-movable objects can be used for interacting with a movable object and to put some movement restraints on the graphical representation of the user interface.

To further increase the understanding of the connection between the physical motion and the resulting emulated movement of an object a physically realistic behaviour is needed. If the resulting emulated movement is not realistic it will be confusing and bewildering to a user.

The dynamic model is based on that all objects have some physical characteristics and that they are affected by the motions detected through a motion sensor in the same way as a normal, physical object would be affected having the same characteristics.

The physical characteristics can be a mass and a physical extent. The mass will emulate inertia in the object determining how quickly it accelerates and rotates as well as how it behaves upon collision with other objects. The physical extent defines the object's borders and is used to determine whether an object collides with another or not.

Some objects are without mass and have no borders this makes them purely graphical and they can accelerate and move at any speed and they do not collide, they merely overlap. Such objects can be used to model information entities for which no function is to be taken such as labels or time notifications. Labels for softkeys should not be movable except as explained with reference to FIG. 7a as they should be kept close to the associated softkey.

Other possible characteristics are friction, elasticity (surface elasticity and volume elasticity).

To realistically model all physical aspects of moving objects and their interaction with each other the dynamic model makes use of: physics modelling, friction modelling, multi-object collision modelling, collision detection based feedback, centre of mass modelling and other techniques used to model dynamic movement. In an embodiment algorithms were used to model Rigid body dynamics, such as linear momentum, angular momentum and torque, simulation methods for motions using a Lagrange multiplier velocity based model and a contact and friction model based on the Dantzig LCP solver.

As is known to a man skilled in the art optimisation problems are can be investigated using Lagrange's method of multipliers which is a method for finding the extrema of a function of several variables subject to one or more constraints; it is the basic tool in nonlinear constrained optimization. It reduces finding stationary points of a constrained function in n variables with k constraints to finding stationary points of an unconstrained function in n+k variables.

As is also known to a person skilled in the art The Dantzig LCP solver solves friction modelling problems by applying Linear Complimentary Programming, LCP as introduced by George Dantzig.

This dynamic model requires heavy computing power and an optimization is used for low resource devices such as a mobile phone. The optimization is based on replacing floating point presentations with fixed-points presentations in calculations to be made by the controller 300. This can be done by performing the replacement from floating-point to fixed-point directly as in table 1 in which Q denotes the mantissa of the fixed point operation and ">>" which entity that is to be replaced. For fast calculations values of 16 or 32 for Q are used. Other values are also possible as will be clear to a skilled person depending on the controller used for the replacement. A direct replacement saves time as no further procedural calls are necessary.

Figure 5A:
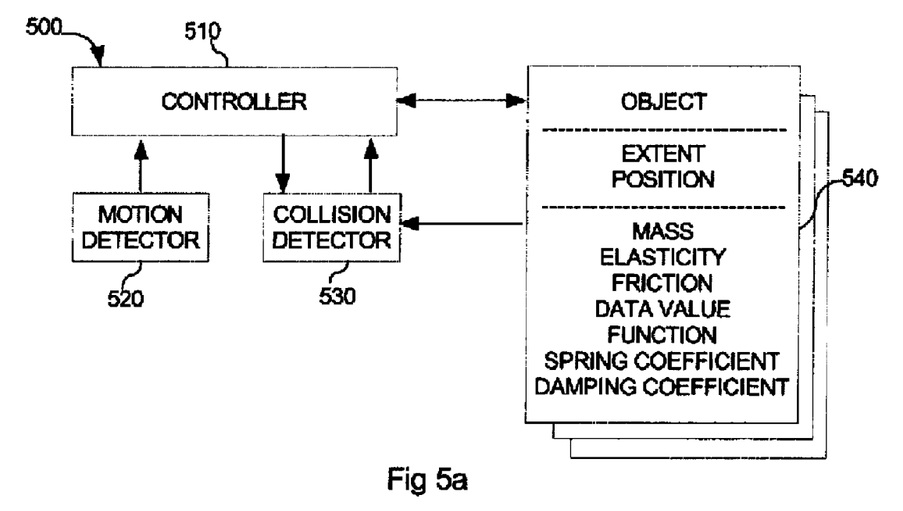
FIG. 5 is a schematic view of a model used in an embodiment, FIGS. 6 a and b are flow charts describing a method each according to an embodiment.

FIG. 5 show a dynamic model 500 for a user interface, UI, having a controller 510. The controller 510 is arranged to create and control one or more objects 540. These objects 540 have some characteristics that are common to all objects and these are their position and their extent. These characteristics are necessary to generate a graphical representation of an object. Some objects have no representation but the position and the extent of the object is still needed to determine its interaction with other objects. Such objects are from hereafter called area objects. Other characteristics are shown in table 2 along with their purposes. The model 500 also has a motion detector 520 from which information is provided to the controller 300 regarding motions the device is subjected to and forces applied to it. The motion detector 520 can be implemented through an acceleration sensor. An integrator can be used to integrate the acceleration detected and from this generate a movement or motion. These motions can be a movement pattern through which a user controls one or more objects. The modelling of the motion of the objects has been discussed and explained above.

In one embodiment a collision detector 530 is also used in the model 500. The collision detector 520 could be made part of the controller 510, but in this description it is described as a separate entity to better illustrate its functionality. If two objects are active, for example one stationary and one dynamic, and a motion is detected the collision detector will start monitoring if any of the objects' positions and extent overlap. A simplified formula for a collision is:

$$\text{pos A}+\text{EXTENT A} \subseteq \text{pos B}+\text{EXTENT B OR}$$

$$\text{pos B}+\text{EXTENT B} \subseteq \text{pos A}+\text{EXTENT A} \Rightarrow \text{COLLISION}$$

where pos is a position that is uniformly added to the extent of an object.

The formula is to be understood as if any part of object A overlaps with any part of object B then there is a collision.

The objects can be either stationary, which can be modelled as having an infinite mass, dynamic, having a finite mass or purely graphical, having a mass of 0. A purely graphical object will be able to travel at any speed and overlap other objects and are used for informative purposes such as labelling.

For dynamic objects an emulated motion is determined between updates of a display. The emulated motion is a function of the current position, current velocity, mass or inertia, the body's orientation, friction of object's surface or surface of surrounding and the force and there from derived applied acceleration subjected to the object. An updated position is calculated from the current position using the known characteristic values and the modelling techniques described herein. The position, velocity and angular velocity can be expressed by vectors and the orientation can be expressed as a 3×3 rotation matrix.

Characteristics such as mass can also be expressed as a matrix. For mass a constant can be used to describe the total mass. A centre vector to express the centre of mass seen from a reference point and an inertia matrix describing how the mass is distributed.

An object can have a data value assigned to it. These data values can be used to notify the user of certain events or they can have other meaning.

Figure 5B:
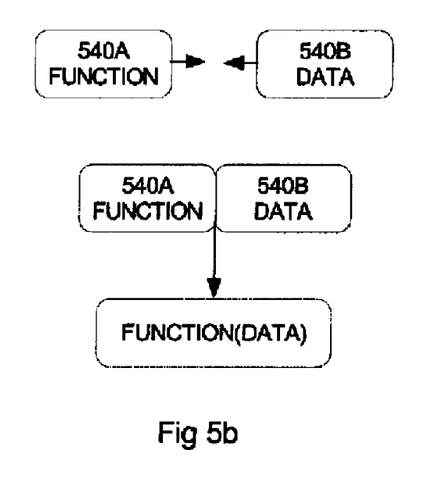

An object 540 can additionally or alternatively have one or more functions associated with it. As such an objected is activated the corresponding function is executed. Examples of such functions are: OPEN, DELETE, CLOSE or POSTPONE. A function can also be designed to work on one or more data values, either being carried by the object itself or by another object. If a collision between a data value object and a function object takes place the function is executed using the data value as a parameter. As can be seen in FIG. 5*b* when a function object 540A and a data object 540B collides as a result the function is executed on the data.

If an object carries more than one function, the function to be executed can depend upon the object collided with and also on the data carried by the object collided with.

For the special objects referred to as area objects explained above a collision occurs when another object enters the area, or in other words, the areas extent overlaps with another objects extent. Area objects can be used as function carrying objects. An example of such an object is a delete zone modelled through an area object having the associated function DELETE.

An object's position might be so that as the graphical representation is shown on a display the object may be partially or completely missing from the display, i.e. it is not visible as it is outside the displayed area.

It should be understood that in this model a collision can be regarded as a movement pattern and a function is to be executed as a certain movement pattern is detected. The movement pattern can then be a controlled movement or a collision. Collisions are thus assumed to be controlled by a user for initiating a certain action. It should also be understood that a motion can be part of a movement pattern (possibly the only part of the movement pattern) and the movement pattern is completed by said motion which causes any corresponding action or function to be taken or executed.

For example, by having an object area virtually positioned in the top of the screen and assigned the function DELETE another object can easily be deleted by throwing it upwards or turning the phone upside down and allowing the object to fall out of the user interface and thereby be deleted. To safeguard against accidental deletion the area object can be assigned a friction which would slow down any object coming over it and thus prevent unwanted execution of the assigned operation, in this case deletion.

A function could also be activated if the carrying object is subjected to a movement pattern, i.e. a sequence of or a single controlled movement that is specific in its nature. Examples can be throwing away (signified by strong acceleration over a period of time), hoisting (signified by a strong upward acceleration followed by a downward acceleration) or a tap (signified by a short pulse or shock).

To safeguard against accidental execution of functions resulting from random collisions and movement patterns a confirmation object can be created and displayed prompting the user to confirm whether the action is deliberate or not. A tap to the device, thereby inducing a slight shock which is detected by the motion detector will execute the function. Alternatively a double tap can be used to accept the action and a single tap to reject or cancel it.

In one embodiment a tactile feedback is generated by the collision detector as soon as a collision is detected. Such a tactile feedback can be in the form of a vibration. For some purposes it is also possible to give a small electric shock. Naturally, also visible and audible feedbacks are possible either alone or in any combination. If two objects collide one type of vibration can be generated and if an object collides with a wall object another type of vibration can be generated. Thus a user can differentiate between different events taking place on the screen and be able to control the device even with out looking. Especially if the user interface is equipped with a text to speech or other voice coder so that information can be read out loud to the user.

To illustrate with an example: a device receives an incoming message and the user is alerted with an audible signal. As the user is partly occupied with another task, but still wants to see what the message is the user can quickly take out the phone, perform an open action, which can be a hoisting motion that will open the object with the message notification as will be described below. The user knows that in the left hand side of the display there is an area for reading the message out loud and leans or tilts the phone to the left side. Due to other factors influencing the motion (such as if the user is riding a train) the object slightly misses the read out loud area and a vibration followed by a screeching sound is emitted from the device informing the user that the object is about to travel through an area associated with a delete operation. The user reacts to the feedback and changes the movement to be more clearly to the left side and as the object collides with the message read area another softer vibration and a pleasant sound is emitted as a feedback. The user is informed that the action is correct, or at least it does not have irrevocable consequences, and to finish it of exaggerates the motion so as to make sure the action is undertaken and area's function to run a text through a text to speech coder is executed on the object's data value, being the text of the message, and the message is read out loud while the object is in the area. To silence the read out, the user simply moves the object out of the area again by controlling the motion of the device. Thus an incoming message can be opened, read and even paused by simple hand gestures that are easy to learn, intuitive to use and without requiring much attention by a user.

In one embodiment a device is subjected to a keylock function and while the keylock function is active only notifying actions will be accepted. For example, if a keylock is activated and there are missed calls, only actions to show the missed calls will be accepted. Any action to delete or call back will be ignored or cancelled by the keylock function. Thus if the motion triggering an action is by coincidence the status of the device will be the same when the user directs his attention to it as it was before the actions were taken.

Figures 4A, 4B, 4C:
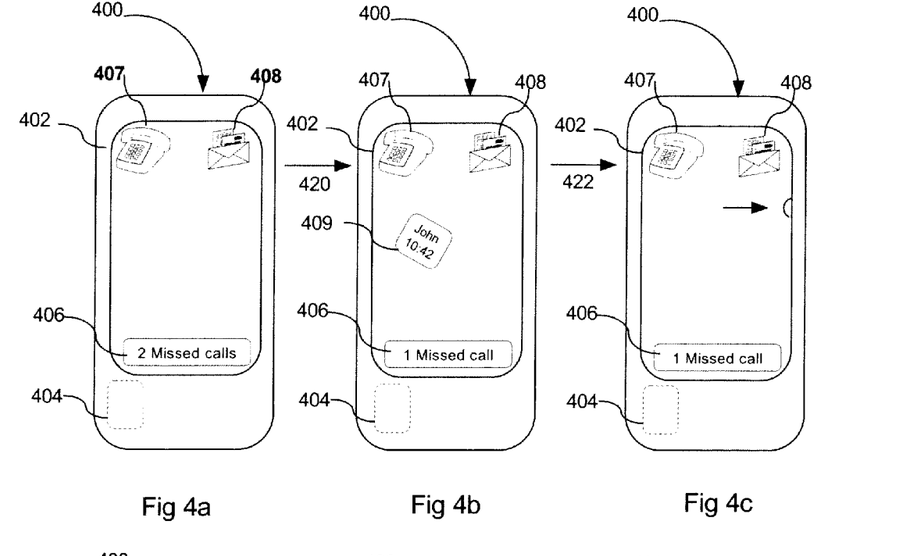
Figures 4D, 4E, 4F:
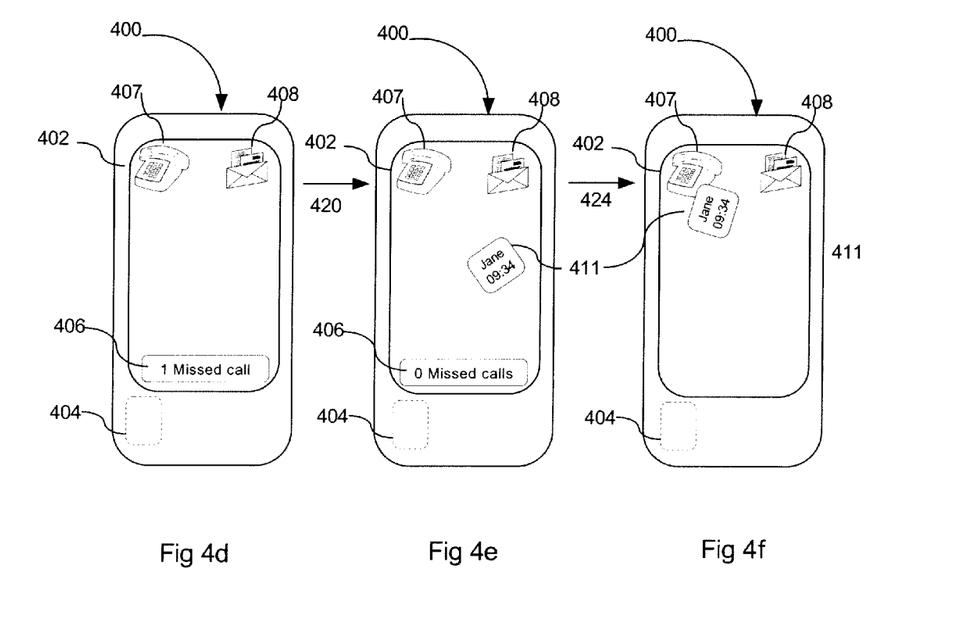

Returning to FIG. 4 an embodiment is shown of a user interface in a device 400 using the models above making the user interface more intuitive to use with a motion sensor 404. The device is as stated above a mobile phone 400 and it has a display 402. In FIG. 4a three objects are displayed on the display 402. They are all stationary which can be modelled by giving them an infinite mass or by simply setting a flag stating that they are stationary. The first object 406 is in the shape of a box with a text indicating or notifying a user that there are 2 Missed Calls. If the user wants to see what the missed calls are, but is currently unavailable or unwilling to reach some control keys (not shown) he simply makes an upward movement 420 imitating a movement pattern for hoisting the box up in the air and down again. This triggers the motion detector 404 to send a signal carrying details describing the movement, such as speed vectors to the controller 300. The controller determines that an open operation has been initiated and executes this. The open operation creates another fourth object 409 and makes it float up from inside the box. This fourth object 409 is a dynamic object and its motion is being emulated whereby the direction is dependant on the original motion detected by the sensor and the speed dependant on the object's 409 mass and the force applied to the mobile phone 400. As can be seen in FIG. 4b, the object 409 has a data value which is displayed on the object 409 indicating that a contact "John" had called at 10:42. The user notices this but chooses not to take action at this point and decides to delete the notification. The user performs a movement pattern simulating a throwing movement 422 that is detected by the motion detector 404 and a signal is sent to the controller 300 that determines that a delete action has been taken and initiates the delete action on the object 409. The object's 409 emulated movement will be displayed as it is being hurdled to the side of the phone in the direction in which the throwing motion was made and the object 409 disappears from the display 402 as seen in FIG. 4c. The movement pattern of throwing away the object thereby causes a function to delete the object 409. As the object's 409 graphical representation has left the display 402 the display is now as in FIG. 4d with the three original objects. The first object 406 now has a data value notifying one missed call and a repeated hoisting movement 420 makes a fifth object 411 to float or fly up from the missed call box object 406. This fifth object also has a data value which is displayed notifying that a contact "Jane" made a call at 9:34 as is shown in FIG. 4e. The user now has four options. He can choose to delete as he did with the previous notification or he can steer or control the movement of the object 411 through the motion detector 404 by controlling the movement of the device 400 to collide with any of the stationary objects displayed. The three stationary objects are the missing call box object 406, now indicating that there are no missing calls, a phone call object 407 and a send message object 408. The two objects, phone call 407 and send message 408, have functions associated with them which functions are clear from the appearance of the graphical representation of the object. Upon collision with such an object the associated function will be initiated. The first object 406 also has an associated function which is to store any object colliding with it. The user chooses to call the contact by controlling or steering, through a motion or movement pattern 424, the fifth object 411 to collide with the Phone call object 407. As the two objects 407 and 411 collide in FIG. 4f the collision is detected in the controller and the associated function of the phone call object 407 is executed on the data value associated with the fifth object 411. As the user has chosen not to save the notification object 411, the missed call box object 406 is deleted.

Alternatively the delete operation initiated by the throwing motion 422 in FIGS. 4b and c can be determined as a collision between the object 409 and a side wall of the display 402 modelled to have no surface so no collision occurs and where the emulated movement clearly brings the object outside the display 402. The side wall can be modelled as an area object.

Alternatively, if both notifying objects 409 and 411 were in the air at the same time and the both collided with the phone symbol 407 a conference call could be initiated to both of them. Thus a function can also be set to operate on more than one data value.

Other notifications that could be displayed are status reports of incoming calls, missed calls, received messages (SMSes, MMSes, emails etc), download status or a special message fetched by a specially adapted application for example arranged to show cartoons according to preset parameters.

Figure 4G:
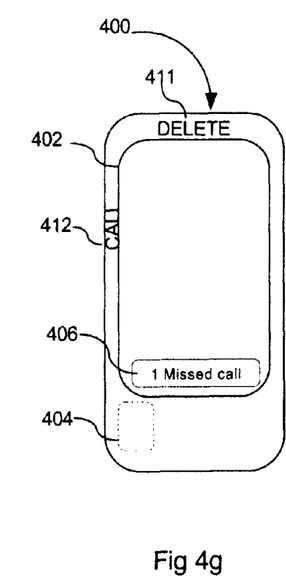
Figure 4H:
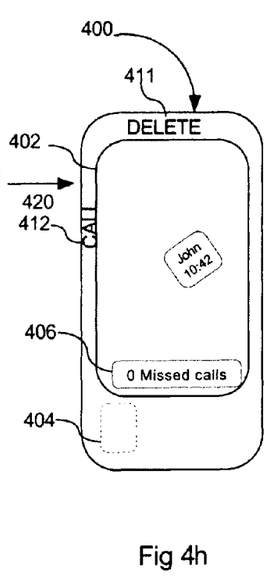
Figure 4I:
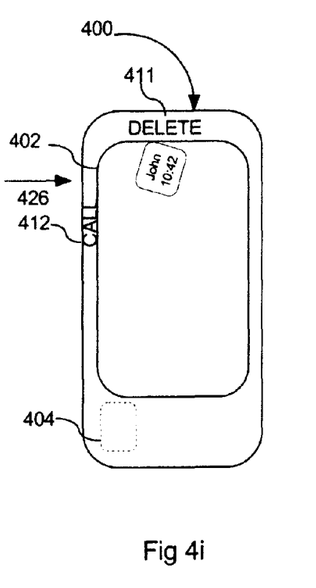

Alternatively, functions can be assigned to areas of the display 402 as can be seen in FIG. 4g. These areas can be modelled as stationary objects having a non-reflective border i.e. capable of overlapping. In FIG. 4g two operations are assigned to the walls and these operations are CALL and DELETE. The operations can be marked with indications 411 and 412. As previously described a user can open the missed call box 406 by a hoisting movement 420 upon which the call notification 409 flies up, see FIG. 4h. To delete it the user controls the object 409 through a movement pattern 426 to collide with the area marked DELETE 411 as shown in FIG. 4i.

Further examples of functions and corresponding movement patters are listed in table 3.

In one embodiment a collision is not necessary to initiate an action. An object that has a data value can also have an associated function with a corresponding movement pattern. In the example above the object 409 could have the associated function of calling the contact with a corresponding movement pattern of a shaking movement. If a user wanted to call the contact displayed he would simply shake the phone and the controller would execute the associated function of calling on the data value being the contact.

Another example is when a downloaded item has been fully downloaded a download box appears. A user can open the item by hoisting it and if the item is a media file a shaking movement would execute a media player to play the downloaded media file.

Most commonly, the more advanced the motion or movement pattern is the safer it is to assume that it has been done on purpose thus safe guarding from coincidental movements. However, a more advanced or complicated motion is more difficult for a user to achieve. Which movement patterns and what combinations that are to be used depend on usability aspects for the phone whether it is a heavy duty model or a fashion model etc as well as the intended user group and a combination of these and other factors.

Figure 6A:
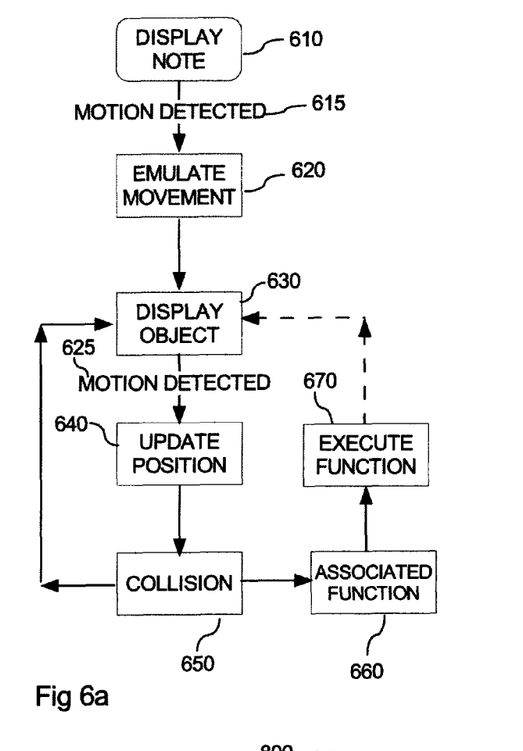

FIG. 6a show a method according to the teachings of the present application. In a first step 610 a notification is displayed. As a motion is detected in an event 615 the motion is determined to be a movement pattern corresponding to an OPEN command and an object carrying the data for the notification is created. Its movement is emulated in step 620 and the object is displayed in step 630. If other objects are present their movements are also emulated in step 620 and the display is updated with the new positions in step 630. As further motions are detected in event 625, the movements are emulated and the positions are updated in step 640. In step 650 it is determined whether any collisions between two objects have taken place. If there are no collisions the objects are displayed in the updated positions in step 630. If there is a collision the associated function is determined in step 660 and executed on the data carried by the object in step 670. As the function is executed the method can return to step 630 of displaying the objects as indicated by the dashed line. Or, the method can terminate depending on the number of remaining objects and the nature of the function.

Figure 6B:
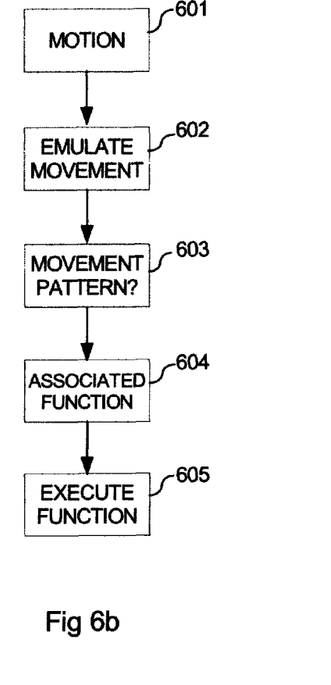

FIG. 6*b* show a method according to the teachings of the present application. In a first step 601 a motion is detected by a controller 300 through a motion detector 404. In the next step 602 a movement for an object 409 is emulated and a check is made if a movement pattern has been completed in step 603. A movement pattern can in this method be any of a collision or other movement patterns. In step 604 it is checked if an object has an associated function which will then be executed in step 605. A movement pattern does not need to be a collision but can for an object having both a data value and a function be a specific movement pattern corresponding to the function. An example of this has been given above with reference to FIG. 4 such as when a user has downloaded a media file and plays it by shaking the device.

Figure 7A:
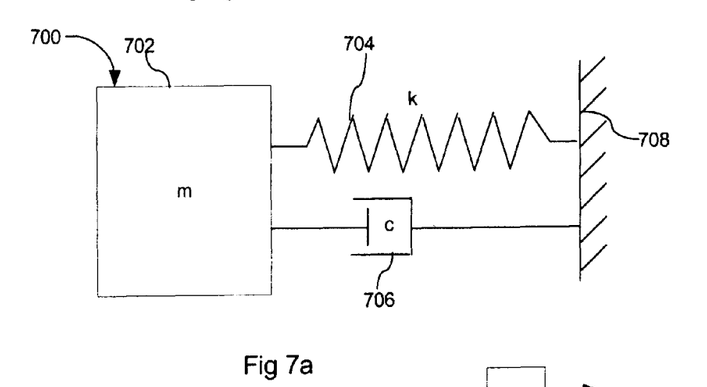
FIG. 7 is a schematic view of a model used in an embodiment.

FIG. 7*a* show a model 700 used to emulate an object's physical behaviour and movement in one axel. To correctly emulate a three dimensional movement one model would be needed for each axel in all requiring three models. This model is used for objects having a fixed point in the user interface thus creating a dynamic behaviour also for stationary objects.

The model 700 is based on a damped spring and an object 702 is connected by a spring 704 and a damper 706 to a fixed position 708. According to Hooke's law the spring has a spring constant k and the force Fs exerted on the string equals the displacement vector x multiplied by this string constant, Fs=kx. In real life the spring constant is not always constant but varies a little bit with the displacement and a better word would therefore be the spring coefficient. The damper 706 is also subjected to a force Fd which equals a damping coefficient c multiplied with a velocity v of an object 702 attached to the damper 706 in the negative, Fd=−cv. These two relationships in combination with Newton's second law of motion, stating that the force F applied to an object equals the mass m multiplied with the acceleration a, F=ma, make up the damped spring model which is used to emulate an object's 702 movement.

Using this model a stationary object can be made to behave dynamically and respond to user induced commands and thereby confirming the actions taken in an intuitive way. The model can also be used to anchor stationary objects but enable them to have an emulated movement as a result of physical reactions, such when a collision is detected the stationary object could react by shaking or bouncing as a result of the shock from the collision with the moving object.

It can also be used as a safe guard feature as the movements of some objects for which the damped spring is applied become more restricted and to allow an object to collide with another a more forceful and deliberate motion is needed to overcome the simulated resistance offered by the spring. In other words, a realistic bounce back effect provides protection for erroneous movements as a more deliberate movement is needed to touch or collide with other object before bouncing back.

Figure 7B:
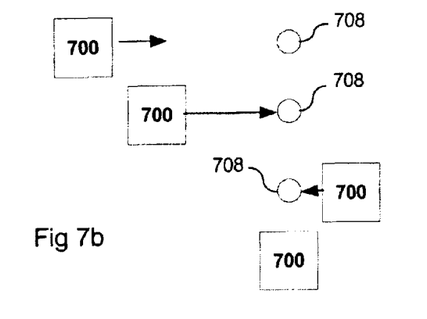

The damped spring model can also be used when moving an object. In FIG. 7*b* an illustrative example is shown. An object 700 is to be moved to a new position 708 and the new position 708 is set to be the fixed point 708 of the model. A modelled spring is then automatically stretched to a displacement x equal to the distance from the fixed point 708 and the object 700 subjecting the object to a force Fs=kx. Also a modelled damper is also stretched. As the object 700 is let go the force Fx will accelerate the object 700 towards the fixed point 708 and due to this the object 700 starts to move towards the fixed point 708 and build up a speed v. The damper will then exert a force Fd acting in the opposite direction and in size equal to Fd=cv which will slow down the object 700. As the object 700 comes closer to the fixed point 708 the accelerating force Fs will decrease at the same time as the de-accelerating force Fd will grow. The object 700 will most often overshoot the fixed point's position 708 and the modelled spring will force the object 700 towards the fixed point 708 again and the object 700 will eventually rest at the new position 708. The time to reach the new position for the first time is denoted as a rise time and the time for it to settle on the new position is denoted as a settling time.

This principle can be applied to key events and scroll events, motion gesture control and touch control such as tap input for example.

It is also possible to maintain a virtual or emulated constant force affecting all dynamic objects, much like a gravitational force. The gravitational force can either be directed internally in the phone for example always towards the bottom of the screen or externally as in coinciding with the direction of the Earths gravitational field. This will enable the objects to behave even more realistic and also safeguard against accidental movements as the objects always strive to fall down and a safe place, object or area like the originating place should be positioned at the lowest point of gravity. For an action to be initiated the controlling motion would thus need to overcome the gravitational field or force and thus be required to be more deliberate. An opened object that is left alone or undisturbed will thus simply fall back into the originating box which in practise will implement a timeout feature for any action taken by the user.

In one embodiment an area object having an associated function DELETE is arranged in the very top of a display. The user interface is also arranged with an externally directed gravitational force. To delete an object a user simply turns a device having such a user interface on its head and allows the object to be deleted to be affected by the simulated gravity and sink into the delete area and be deleted. This leads to the mental image of deleting an object by pouring it out of the top of the device.

It should be understood for all embodiments described herein that an object can also exist outside of the graphical representation, the graphical representation thus only acting as a window into the user interface.

It should also be noted that for some objects a collision is determined to have happened only if there is a total overlap of two objects' extents. This can be used for areas wherein the object to be effected by a function of an area is only affected if it totally enters the area. In the example above this would mean that if the delete area is said to be just outside the displayed area the object would have to leave the screen completely before being deleted.

Figure 8:
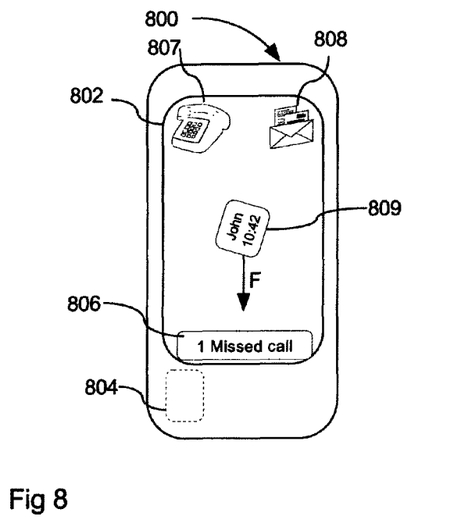
FIG. 8 is a plane front view of a device according to an embodiment.

FIG. 8 show an example of how a gravitational force would affect the situation in FIG. 4*b*. An object 809 has been opened from the missed call box object 806 and is currently hanging in mid air. A gravitational force denoted F in the figure is acting on the notification object 409 causing it to fall back towards the missed call box 806. Unless the user controls the objects movement by motioning the device 800 to make it fly up towards one of the other objects 807, 808 to initiate a function the notification object 809 will fall back into the missed call box object 806 and will be saved there for a later time. Thus a variable timeout for the operation of opening the missed call box is achieved during which time period it is possible to either perform an action on the produced notification object 809 or to postpone or reset the time out by hoisting the object 809 further.

It could also be possible to introduce an element, possibly as a stationary object, in which the other objects will be moving. Such an element can be used to simulate different environment having particular properties. One example is to simulate a water-filled screen in which the objects float around. Depending on their extent, their body mass and the density of the surrounding element or water, they will either sink or float up as is known from Archimedes' principle.

For example if a user interface surface or area is designed to be half-filled with water a model for functions only applicable to some objects or where some functions requires added security is achieved. One such situation could be where all other objects float and the delete operation is modelled in an object at the bottom. To delete an object a forced movement pushing the object under water is thus required and will most likely not happen by chance.

The elements can also be used to implement different timeouts and timeout functions for different objects by making some float and some sink and at speeds that depend on their density or mass. Some objects will thus rise to one function object and some will sink to another function object if left alone or undisturbed. The density will determine the speed i.e. the timeout time period.

It is also possible to add texture objects having a certain friction or other characteristic influencing the movements of the other objects as well as creating a visual effect that can be used to increase the visual conception of the graphical representation of the user interface and thus further the understanding of how it works leading to an easier and more intuitive user interface.

As the object behaves like a real object, the mental connection between the operation and its effect becomes more intuitive and thus easy to learn.

The various aspects of what is described above can be used alone or in various combinations. The teaching of this application may be implemented by a combination of hardware and software, but can also be implemented in hardware or software. The teaching of this application can also be embodied as computer readable code on a computer readable medium. It should be noted that the teaching of this application is not limited to the use in mobile communication terminals such as mobile phones, but can be equally well applied in Personal digital Assistants (PDAs), MP3 players, personal organizers or any other device designed for providing information while maintaining low power consumption.

The teaching of the present application has numerous advantages. Different embodiments or implementations may yield one or more of the following advantages. It should be noted that this is not an exhaustive list and there may be other advantages which are not described herein. One advantage of the teaching of this application is that a device can be made to display information in a manner that is easy to learn and intuitive to use.

Another advantage of the teaching of the present application is that a user can operate certain functions such as retrieving information from a device with only a simple and imprecise command or movement not requiring the full attention of a user.

Although the teaching of the present application has been described in detail for purpose of illustration, it is understood that such detail is solely for that purpose, and variations can be made therein by those skilled in the art without departing from the scope of the teaching of this application.

For example, although the teaching of the present application has been described in terms of a mobile phone, it should be appreciated that the teachings of the present application may also be applied to other types of electronic devices, such as music players, palmtop computers and the like. It should also be noted that there are many alternative ways of implementing the methods and apparatuses of the teachings of the present application.

The term "comprising" as used in the claims does not exclude other elements or steps. The term "a" or "an" as used in the claims does not exclude a plurality. A unit or other means may fulfil the functions of several units or means recited in the claims.

Tables

TABLE 1

Floating-point to Fixed-point replacements.

| Floating point operation | Fixed point operation |
|---|---|
| x*y | (x*y) >> Q |
| x/y | (x << Q)/y |
| sqrt(x) | sqrt(x << Q) |
| sin(x) | sinT[(x >> Q)] |
| cos(x) | sinT[(x >> Q) + 90] |

TABLE 2

Object characteristics and corresponding purposes.

| Characteristic | Purpose |
|---|---|
| Extent | To determine graphical representation and for collision detection. |
| Position | To determine graphical representation and for collision detection. |
| Mass | For determining movement through acceleration, de-acceleration, inertia and effect upon collision. |
| Elasticity | The object's behaviour upon collision both for continued movement and for graphical appearance. |
| Friction | To determine continued movement upon collision. |
| Data value | Used to notify or carry a value. |
| Function | Enables a function to be initiated upon activation through a movement pattern or a collision. |
| Spring coefficient | To determine movement. |
| Damping coefficient | To determine movement. |
| Velocity | To determine movement. |
| Acceleration | To determine movement. This is an implicit value that can also be handled exclusively by the controller. |
| Force | To determine movement. This is an implicit value that can also be handled exclusively by the controller. |
| Orientation | To determine what to show in the graphical representation and how to determine further movement. |

TABLE 3

Functions and their associated movement patterns.

| Function | Movement pattern |
| --- | --- |
| For a call reminder: | |
| Hoist | OPEN |
| Throw away | DELETE |
| Collide with phone symbol | Place call |
| Collide with trash can | Delete |
| Collide with mail symbol | Send message |
| Repeated hoist | Open next reminder |
| For an alarm | |
| Throw away | Postpone - the acceleration determines how much the alarm will be delayed. |
| Tap | Snooze |
| Double tap | Start media player and snooze. |

The invention claimed is:

1. A computer program product comprising at least one non-transitory computer-readable storage medium having computer-executable program code instructions stored therein, the computer-executable program code instructions comprising program code instructions to:
receive an indication of an incoming communication to an apparatus;
cause a first object to be displayed, the first object indicating a visual indication of the incoming communication;
cause a second object to be displayed, wherein the second object provides a visual indication of an associated function, wherein the associated function initiates a response to the incoming communication;
detect a motion of the apparatus;
cause display of an emulated movement of the first object according to the detected motion;
detect an emulated collision between the first object and the second object; and
in response to detecting the emulated collision, cause execution of the function on a data value associated with the first object, such that the response to the incoming communication is initiated.

2. A computer program product according to claim 1, wherein the computer-executable program code instructions further comprise program instructions to:
determine an updated position of the first object from an original position depending on said physical characteristic and detected motion; and
cause display of the first object at said updated position.

3. A computer program product according to claim 1, wherein the detected motion is based on a physical characteristic, wherein the physical characteristic comprises a mass for emulating inertia of said first object.

4. A computer program product according to claim 1, the detected motion is based on a physical characteristic, wherein the physical characteristic comprises a spring coefficient and a damping coefficient and wherein said generation of said emulated movement is based on a damped spring dynamic.

5. A computer program product according to claim 1, wherein the detected motion is based on a physical characteristic, wherein the physical characteristic comprises an extent.

6. A computer program product according to claim 1, wherein the detected motion is based on a physical characteristic, wherein the physical characteristic comprises a velocity vector.

7. A computer program product according to claim 1, wherein the computer-executable program code instructions further comprise program instructions to:
cause display of a graphical representation of at least one additional object, wherein said at least one additional object has a physical characteristic and said emulated movement of said first object is further based on said physical characteristic of said at least one additional object.

8. A computer program product according to claim 1, wherein the computer-executable program code instructions further comprise program instructions to:
cause display of a data value associated with at least the first object or additional object.

9. A computer program product according to claim 1, wherein the computer-executable program code instructions further comprise program instructions to:
execute a function associated with a movement pattern on the first object upon detection of the movement pattern.

10. A computer program product according to claim 9, wherein said movement pattern corresponds to a throwing movement and said function is a delete operation.

11. A computer program product according to claim 9, wherein said movement pattern corresponds to an upwards movement and said function is an open operation.

12. A computer program product according to claim 1, wherein the first object has an associated function.

13. A computer program product according to claim 9, wherein said function is any taken from a group comprising: a delete operation, a call operation, a send message operation, a postpone operation, an open operation and a read out operation.

14. A method comprising:
receiving an indication of an incoming communication to an apparatus;
causing a first object to be displayed, the first object indicating a visual indication of the incoming communication;
causing a second object to be displayed, wherein the second object provides a visual indication of an associated function, wherein the associated function initiates a response to the incoming communication;
detecting a motion of the apparatus;
causing display of an emulated movement of the first object according to the detected motion;
detecting an emulated collision between the first object and the second object; and
in response to detecting the emulated collision, causing execution of the function on a data value associated with the first object, such that the response to the incoming communication is initiated.

15. A method according to claim 14, wherein the detected motion is based on a physical characteristic, wherein the physical characteristic comprises a mass for emulating inertia of said first object.

16. A method according to claim 14, wherein the detected motion is based on a physical characteristic, wherein the physical characteristic comprises a spring coefficient and a damping coefficient and wherein said generation of said emulated movement is based on a damped spring dynamic.

17. A method according to claim 14, wherein the detected motion is based on a physical characteristic, wherein the physical characteristic comprises a velocity vector.

18. A method according to claim 14, further comprising:
causing display of a graphical representation of at least one additional object, wherein said at least one additional object has a physical characteristic and said emulated movement of said first object is further based on said physical characteristic of said at least one additional object.

19. An apparatus comprising at least one processor and at least one memory including computer program code, the at least one memory and the computer program code configured to, with the processor, cause the apparatus to at least:
receive an indication of an incoming communication to a device;
cause a first object to be displayed, the first object indicating a visual indication of the incoming communication;
cause a second object to be displayed, wherein the second object provides a visual indication of an associated function, wherein the associated function initiates a response to the incoming communication;
detect a motion of the device;
cause display of an emulated movement of the first object according to the detected motion;
detect an emulated collision between the first object and the second object; and
in response to detecting the emulated collision, cause execution of the function on a data value associated with the first object, such that the response to the incoming communication is initiated.

20. An apparatus according to claim 19, wherein the detected motion is based on a physical characteristic, wherein the physical characteristic comprises a mass for emulating inertia of said first object.

21. An apparatus according to claim 19, wherein the detected motion is based on a physical characteristic, wherein the physical characteristic: comprises a spring coefficient and a damping coefficient and wherein said generation of said emulated movement is based on a damped spring dynamic.

22. An apparatus according to claim 19, wherein the detected motion is based on a physical characteristic, wherein the physical characteristic comprises an extent.

23. An apparatus according to claim 20, wherein the detected motion is based on a physical characteristic, wherein the physical characteristic comprises a velocity vector.

24. An apparatus according to claim 20, wherein the at least one memory and the computer program code are further configured to cause the apparatus to at least:
cause display of a graphical representation of at least a third object, wherein said third object visually indicates an additional associated function, different from the associated function of the second object.

* * * * *

UNITED STATES PATENT AND TRADEMARK OFFICE
CERTIFICATE OF CORRECTION

PATENT NO. : 9,569,086 B2
APPLICATION NO. : 11/954845
DATED : February 14, 2017
INVENTOR(S) : Pikkujamsa et al.

It is certified that error appears in the above-identified patent and that said Letters Patent is hereby corrected as shown below:

In the Claims

Column 20,
Lines 14 and 18, "claim 20" should read --claim 19--.

Signed and Sealed this
Thirty-first Day of October, 2017

Joseph Matal
*Performing the Functions and Duties of the
Under Secretary of Commerce for Intellectual Property and
Director of the United States Patent and Trademark Office*